Aug. 28, 1962  R. L. MYERS  3,051,522
SWIVEL SEAT CONTROL
Filed April 15, 1960  5 Sheets-Sheet 1
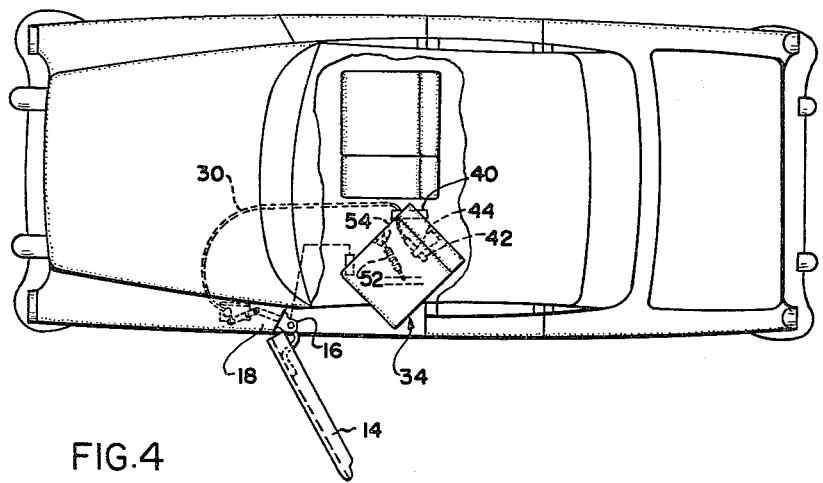
FIG. 1
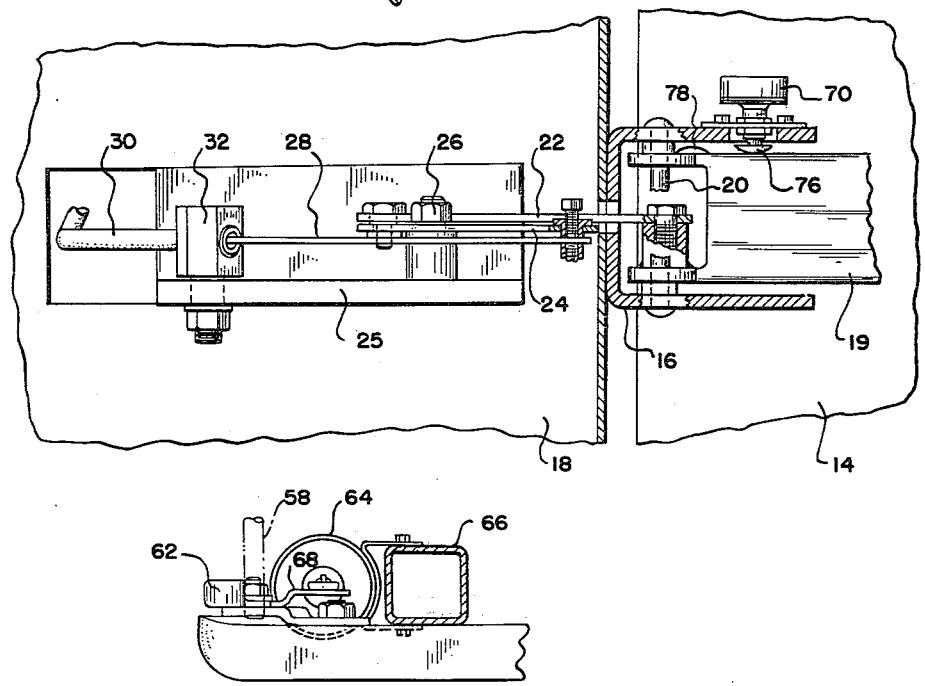
FIG. 4
FIG. 7
INVENTOR.
RICHARD L. MYERS.
BY
ATTORNEY.

Aug. 28, 1962 R. L. MYERS 3,051,522
SWIVEL SEAT CONTROL
Filed April 15, 1960 5 Sheets-Sheet 2

INVENTOR.
RICHARD L. MYERS.
BY
ATTORNEY

Aug. 28, 1962 R. L. MYERS 3,051,522
SWIVEL SEAT CONTROL
Filed April 15, 1960

INVENTOR.
RICHARD L. MYERS.

INVENTOR.
RICHARD L. MYERS.

Aug. 28, 1962 R. L. MYERS 3,051,522
SWIVEL SEAT CONTROL
Filed April 15, 1960 5 Sheets-Sheet 5

INVENTOR.
RICHARD L. MYERS.
BY
ATTORNEY

3,051,522
Patented Aug. 28, 1962

3,051,522
SWIVEL SEAT CONTROL
Richard L. Myers, Royal Oak, Mich., assignor to Dura Corporation, Oak Park, Mich., a corporation of Michigan
Filed Apr. 15, 1960, Ser. No. 22,600
6 Claims. (Cl. 296—68)

This invention relates to seat actuating equipment for motor vehicles and more particularly to an improved seat actuating mechanism for an automobile swivel seat.

The principal object of the present invention is the provision of improvements in motor vehicle seat actuating mechanism that are embodied in a compact and reliable actuator system of the type indicated having new and automatic function by virtue of certain novel structure not heretofore combined.

The above and related objects will become apparent during the course of the following description taken in conjunction with the accompanying drawings.

In the drawings:

FIG. 1 is a plan view of a motor vehicle equipped with seat actuating mechanism embodying the present invention with the moveable parts of the mechanism shown in one operative position.

FIG. 4 is a fragmentary vertical sectional view of the structure of FIG. 3 taken along the line 4—4 thereof.

FIG. 7 is an end elevational view of the structure of FIG. 6 with parts in section as viewed in direction indicated and along the line 7—7 thereof.

Figure 5:
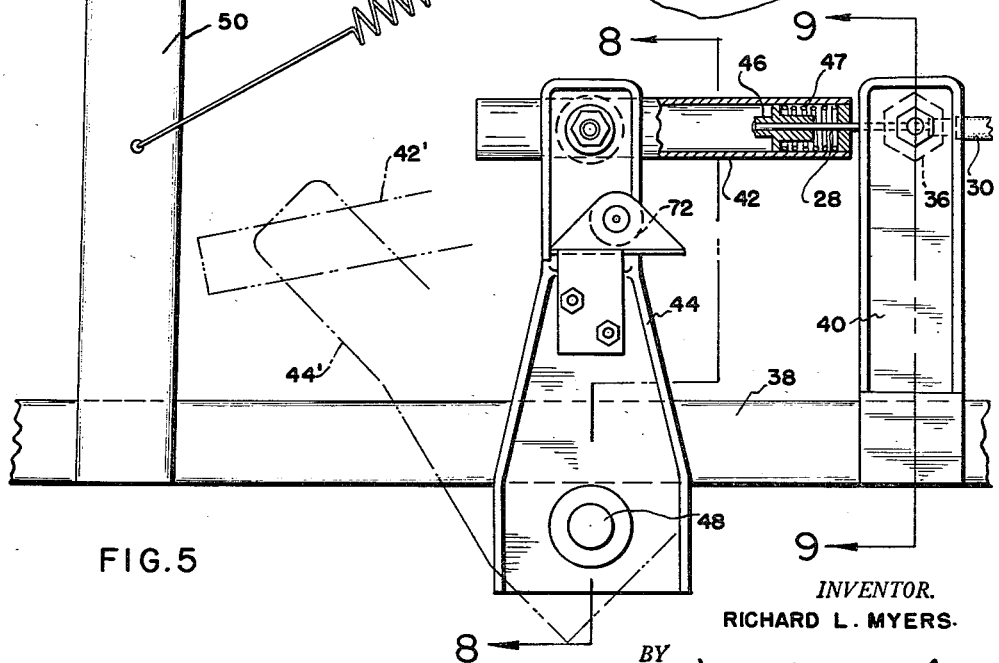
FIG. 5 is a plan view of the structure beneath the left front seat of said vehicle with parts in section.
Figure 8:
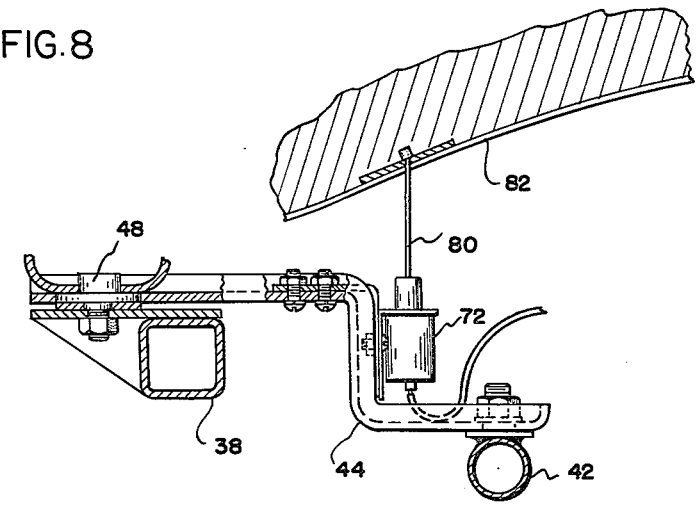
FIG. 8 is a vertical sectional view of a part of the structure of FIG. 5 taken along the line 8—8 thereof showing additionally a part of the cushion for said seat.
Figure 9:
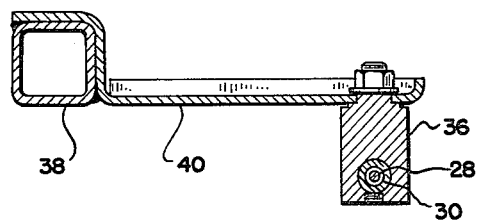
FIG. 9 is a vertical sectional view of a part of the structure of FIG. 5 taken along the line 9—9 thereof.

Referring to the drawings in greater detail, 14 indicates the door of the vehicle which is hinged at 16 to its corresponding door pillar 18, the pivot for the supporting arm 19 of the door at the hinge being shown and indicated at 20. Adjacent the pivot 20 a link 22 is pivotally connected at one end to the door as shown and at its other end to another link 24 which is pivotally mounted by way of a support member 25 joined to the inside of the door pillar 18 between its ends as shown and indicated at 26. The end of the link 24 opposite that joined to the link 22 is secured to one end of a flexible cable 28 which is slidably carried in a flexible housing 30 anchored at its end corresponding to said one cable end within the door pillar 18 as shown and indicated at 32. The anchor 32 for the cable housing 30 is supported on the member 25 as shown. The cable and housing extend through the side wall and fire wall of the vehicle to the rear of a swivel seat generally designated 34 which is the seat that follows the movement of the door 14 as will be described. The opposite cable and housing ends are connected to the mounting structure for the seat 34 as best shown in FIG. 5 from which it can be seen that this housing end is anchored at 36 to stationary parts which include a transverse tubular subframe 38 from which extends a supporting member 40 to which the anchor 36 is directly affixed. The corresponding end of the cable 28 is joined to moveable parts of the seat mount which include a tubular member 42 pivotally secured to the free end of the swivel base 44 of the seat mount and a slide member 46 to which this cable end is directly affixed which in turn is slidably carried in the tubular member 42. The slide member 46 is provided with an annular shoulder as shown on which an overtravel spring 47, the purpose of which will later appear, operates and against the sealed end of the member 42 through which the cable end projects. The swivel base 44 is mounted on the subframe 38 as best shown in FIGS. 5 and 8 and 48 designates its pivot axis about which the seat is moveable in an arc between forward facing position in the vehicle (FIG. 5) and egress assisting or out facing position in which it faces in the general direction of the door opening as shown in FIG. 1. In FIG. 5 in dotted outline is shown the swivel base and tubular member in the out facing position of the seat and these parts in this position are indicated by their same reference numerals prime in this figure. A longitudinal subframe which extends from the subframe 38 to which it is secured as shown in this same figure is designated 50 and serves as an anchor for one end of a tension spring 52 the other end of which is secured as at 54 to the seat cushion 56 for the seat at its inside, i.e. the side of the seat cushion which is closest to the adjacent passenger front seat. The spring 52 is in tension when the seat 34 is in its forward facing position and thus assists in swiveling the seat into its other extreme position.

Figure 6:
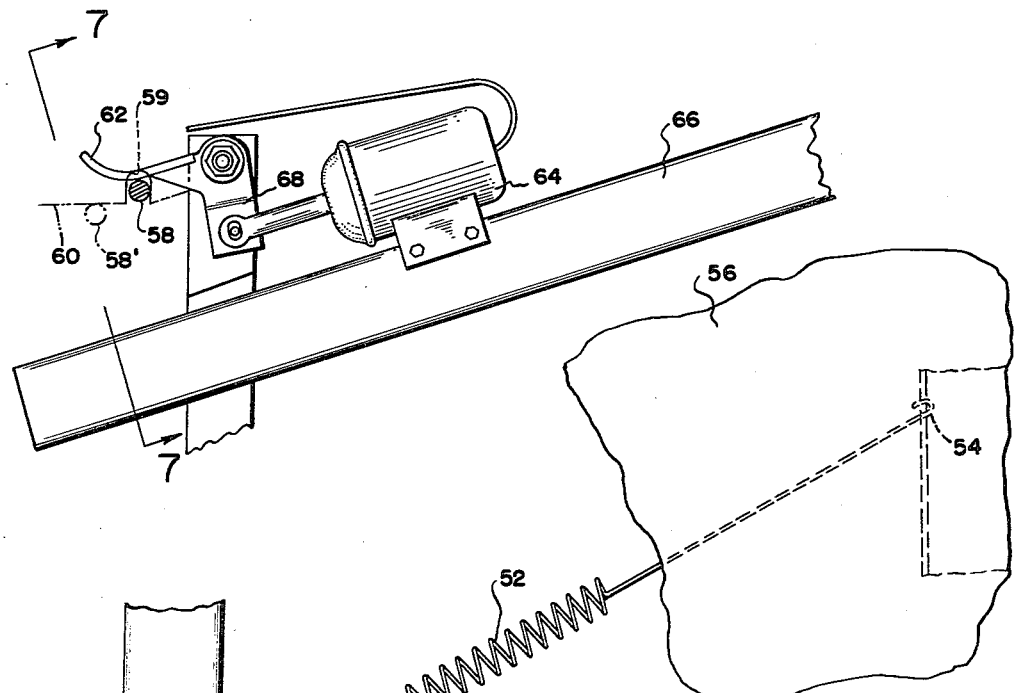
FIG. 6 is a side elevational view of the latch means included in said mechanism.

The seat 34 is retained in its forward facing position by latch means which in the form shown include a spring-biased latch pin 58 affixed to the seat by means not shown which pin is engageable in a detent 59 on a plate 60 that is affixed to the seat subframe and a latch release member is provided for moving the pin out of its detent into release position which is shown in dotted outline in FIG. 6 and in which position it is indicated by its same reference numeral prime. The latch release member is in the form of a bell crank one arm 62 of which contacts the pin 58 and may be manually operated by hand pressure applied to its free end. The latch means further include a solenoid indicated at 64 which is mounted on a subframe member 66 for the seat and the plunger of the solenoid is attached to the other arm 68 of the latch release member. The seat upon being actuated to its forward facing position is by this reason alone latched as the pin 58 moves into its detent by the spring pressure on it and correspondingly pivots the latch release member pulling the plunger outwardly of its solenoid into the position for these parts as shown in FIG. 6.

Figure 3:
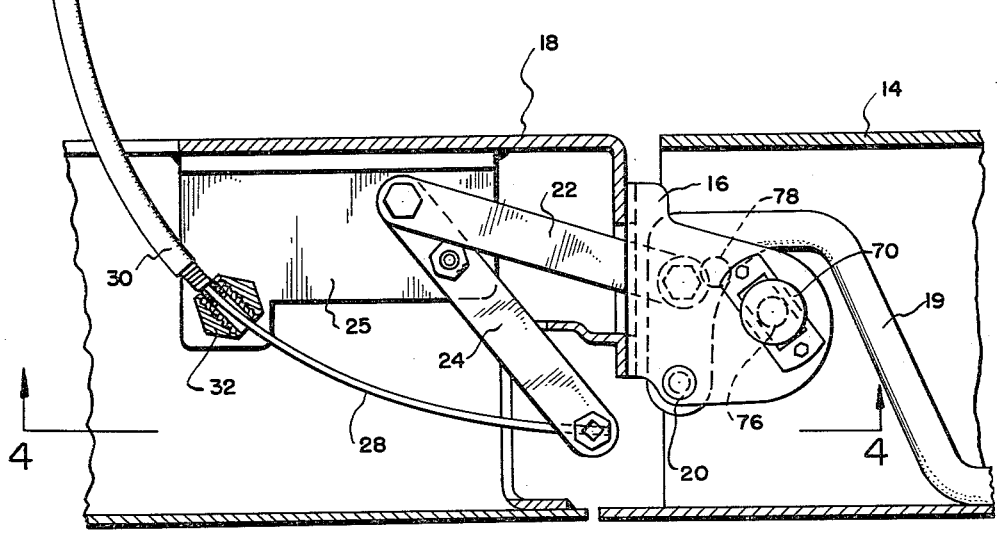
FIG. 3 is a view similar to FIG. 2 with said door in its fully closed position.
Figure 2:
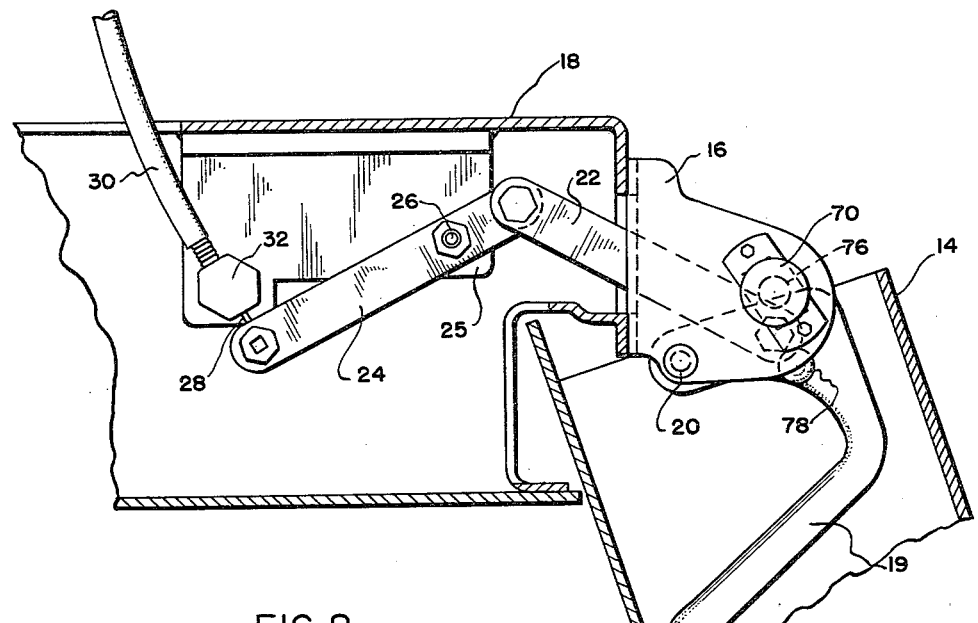
FIG. 2 is a fragmentary horizontal sectional view at the hinge for the left vehicle door in its fully open position.
Figure 10:
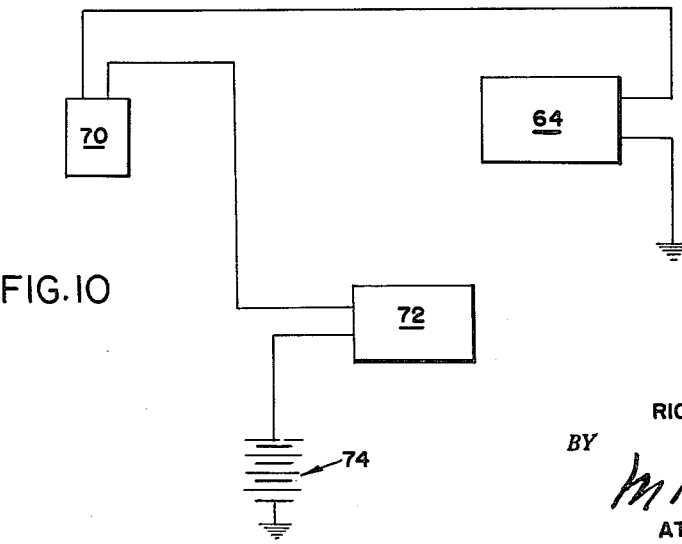
FIG. 10 is a schematic view of circuitry included in said mechanism.

The solenoid 64 is also shown schematically in FIG. 10 and indicated therein in block diagram form which figure shows the circuitry included in the seat actuating mechanism. Such circuitry includes in addition to the solenoid 64, a hinge switch 70 and an override switch 72 in series across a power source indicated at 74 which may be the storage battery for the automobile. The hinge switch 70 as the name implies is located in the door hinge as best shown in FIGS. 2–4 and the body of the switch is affixed to the top plate of the hinge 16 away from the pivot axis 20 so that the plunger for the switch contacts extends downwardly into engagement with the door supporting arm 19. The switch plunger has a rounded head 76 which is in the path of movement of a rounded protuberance 78 on the arm 19 so that when the door 14 is opened a predetermined amount the head is engaged by the protuberance to depress the plunger and close the contacts of the switch 70. Closing of the contacts of the switch 70 actuates the solenoid 64 when the seat 34 is latched provided the contacts of the override switch 72 are also closed.

Figure 11:
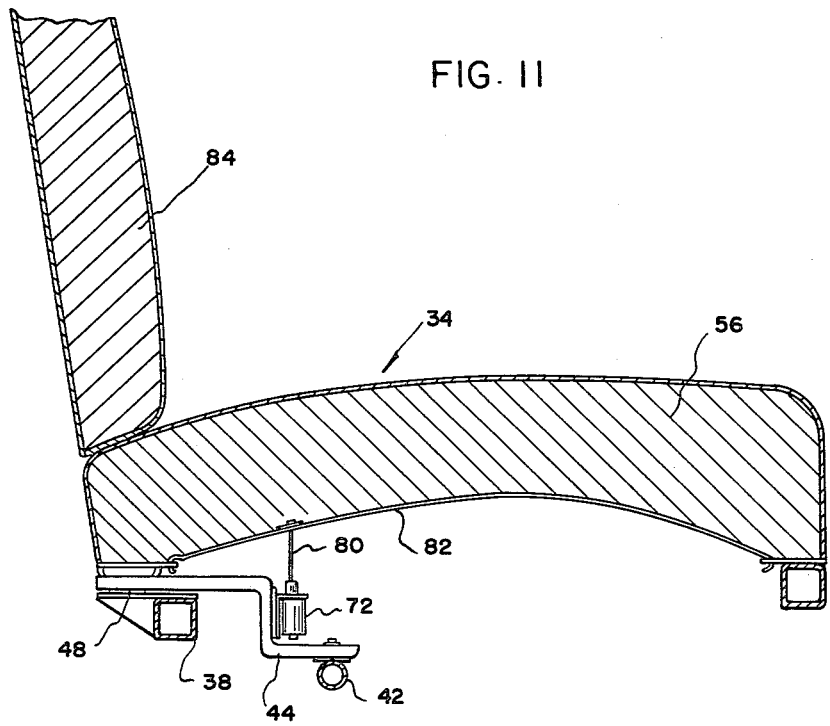
FIG. 11 is a vertical sectional view through the cushions of said seat showing operatively associated parts in elevation.
Figure 12:
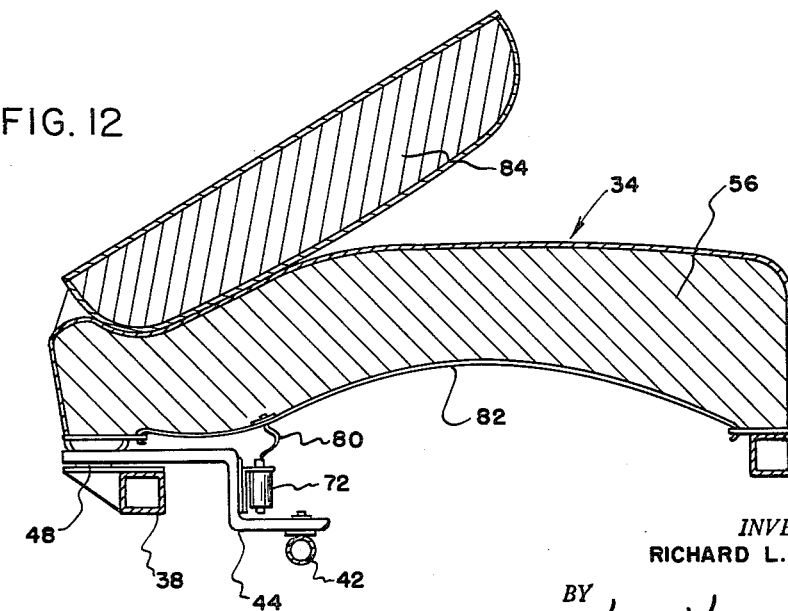
FIG. 12 is a view similar to FIG. 11 showing the cushions in a different relative position.

The override switch 72 is disposed below the seat cushion 56 and is mounted on the swivel base 44 as shown best in FIGS. 8 and 11–12. The contacts of the switch 72 are of the normally open pull to close type and a tension member in the form of a cord 80 joins its plunger to the springs 82 on the bottom of the seat cushion 56. When the seat cushion is relaxed as shown in FIG. 11 the cord 80 is in tension which maintains the contacts of the switch closed enabling the door hinge switch 70 to place the solenoid 64 in circuit. The disposition of the override switch 72 in relation to the seat cushion is rearwardly of its center sufficiently to relax the cord 80 upon flexure of the seat cushion by the weight thereon of the back cushion of the seat which is indicated at 84 when it is tipped forwardly as shown in FIG. 12 as from activity of a rear seat passenger in his efforts to exit from the vehicle. Obviously the cord 80 is similarly relaxed upon flexure of the seat cushion from the weight of an occupant and whenever the cord 80 is relaxed the contacts of the switch 72 are maintained open which prevents the solenoid 64 from being energized notwithstanding the condition of the contacts of the door hinge switch.

In operation of the mechanism described, assuming the seat 34 is latched and its seat cushion 56 is in its relaxed condition, when the door 14 is opened its supporting arm 19 actuates the linkage 22—24 which begins to push the end of the cable 28 attached to the linkage into its housing 30 and the other end of the cable out of it which moves the slide member 46 relative to the tubular member 42 with aid of the urging of the overtravel spring 47. During the travel of the slide member 46 toward the end of the member 42 opposite from that at which it is shown in FIG. 5 the protuberance 78 on the arm 19 moves toward the head 76 on the plunger of the switch 70 and if the opening movement of the door is stopped before the point at which two engage nothing occurs in the way of actuating the seat and the door may be returned to close position without any tendency for the seat to move. If however the door is opened to the extent mentioned the contacts of the switch 70 close which energizes the solenoid 64 and its plunger is pulled inwardly pivoting the latch release member so that its arm 62 moves the latch pin 58 out of its detent 59 which releases the seat 34 for swiveling. Continued opening movement of the door 14 pushes the cable 28 further into its housing which pushes the slide member 46 against said opposite end of the member 42 carrying the swivel base 44 and the seat with it toward its extreme open position in FIG. 1 which is reached when the door is fully opened to the position shown for it in FIG. 2. While the cable 28 is being pushed through its housing during the opening movement of the door to actuate the seat to its out facing position it is assisted by the tension spring 52. Because of the time delay in the interconnecting means between the seat and the door the former follows the movement of the latter.

When the door is then closed with the seat cushion 56 in its relaxed position the door supporting arm 19 actuates the linkage 22—26 to pull the cable 28 through its housing 30 which pulls the slide member 46 against the urging of the overtravel spring 47 which resists the movement of the member 46 sufficiently to pull the member 42 with the cable and thus carry the swivel base 44 and the seat 34 with it toward its forward facing position. The resistance to compression of the overtravel spring 47 is greater than the resistance to extension of the tension spring 52 against the urging of which the seat is pulled into its extreme closed position by the pulling of the cable upon closing of the door. The seat 34 again follows the movement of the door 14 but because of the action of the overtravel spring 47 the seat attains its extreme position while the door is not yet fully closed, the final movement of the door into its extreme closed position compressing the spring 47 into the compressed position for it shown in FIG. 5. When the seat reaches its extreme forward facing position it is automatically latched in this position as before described.

When the seat 34 is occupied the contacts of the override switch 72 are opened preventing the solenoid 64 from being energized and the door 14 may be opened any amount without unlatching the seat. This is of advantage to the driver of the vehicle who can for instance back up with his door opened for observation behind him. When the occupant desires to exit from the vehicle he may manually unlatch the seat and swivel it himself to its extreme outfacing position with assist from the spring 52. The combined action of the occupant swiveling the seat to exit and opening the door are in aid of each other by virtue of the means described interconnecting the seat and the door. Closing of the door automatically returns the seat to its forward facing position in which it is automatically latched. If the back cushion is tipped forward the door may be opened any amount without the seat being unlatched which prevents any hindrance to a rear seat passenger while he is exiting from the vehicle. When the occupant mounts the seat in its outfacing position to assume his normal driving position behind the wheel he may swivel the seat himself to its forward facing position which assists in closing of the door as the two actions are also in aid of each other by reason of said interconnecting means.

It will thus be seen that there has been provided by the present invention seat actuating mechanism for the swivel seat of an automobile in which the object hereinabove set forth together with many thoroughly practical advantages are successfully achieved. While the preferred embodiment of the invention has been shown and described it is to be understood that variations and modifications may be made without departing from the spirit of the invention or the scope of the appended claims.

What is claimed is:

1. In a motor vehicle seat actuating mechanism for a swivel seat, the combination comprising latch means for the seat, means operative on the latch means for unlatching the seat, linkage means operative upon movement of a door of a vehicle, means interconnecting the linkage means and the seat to move the latter, said interconnecting means constructed in relation to the seat and the linkage means so that the seat follows the movement of the door, means actuable at a predetermined point in the door movement for operating the unlatching means, and override means capable for rendering the last-mentioned means inoperative, said override means responsive to the flexure condition of a cushion for the seat.

2. In a motor vehicle seat actuating mechanism for a swivel seat, the combination comprising linkage means constructed for operation in a door hinge of a vehicle, a flexible cable, a flexible housing for said cable, one end of the cable joined to said linkage means, the corresponding end of the housing constructed for anchoring the same adjacent the door hinge of said vehicle, the cable and housing constructed for operative extension between the door hinge of said vehicle and the seat mount thereon, means for pivotally joining the other end of said cable to the swivelable part of said seat mount, and the other end of the housing constructed for anchoring the same to the stationary part of said seat mount, said pivotally joining means including a slide part for said other cable end, a housing for the slide part, and an overtravel spring in the housing operating between the slide part and one end of the housing.

3. In a motor vehicle having a swivel seat swivelable between forward facing and outfacing position, seat actuating mechanism comprising, in combination, latch means for the seat in its forward facing position, a solenoid for operating the latch means to unlatch the seat, linkage means operative in the door hinge of said vehicle, a flexible cable, a flexible housing for said cable, one end of the cable joined to said linkage means, the corresponding end of the housing anchored adjacent said door hinge, the other end of the cable pivotally joined to the swivelable part of the seat mount, the other end of the housing anchored to the stationary part of the seat mount, the linkage means and the cable constructed in relation to the door so that as the seat is swiveled between its said position it follows the movement of the door, a switch in the door hinge, said switch capable of energizing the solenoid from the vehicle electrical system, an actuator for the contacts of said switch moveably mounted adjacent the door hinge so as to actuate said contacts at a predetermined point in the movement of the door.

4. In a motor vehicle having a swivel seat swivelable between forward facing and outfacing positions, seat actuating mechanism comprising, in combination, latch means for the seat in its forward facing position, a solenoid for operating the latch means to unlatch the seat, linkage means operative in the door hinge of said vehicle, a flexible cable, a flexible housing for said cable, one end of the cable joined to said linkage means, the corresponding end of the housing anchored adjacent said door hinge, the other end of the cable pivotally joined to the swivelable part of the seat mount, the other end of the housing anchored to the stationary part of the seat mount, the linkage means and the cable constructed in relation to the door so that as the seat is swiveled between its said positions it follows the movement of the door, a switch in the door hinge, said switch capable of energizing the solenoid, an actuator for the contacts of said switch moveably mounted adjacent the door hinge so as to actuate said contacts at a predetermined point in the movement of the door, an override switch, an electrical circuit for connecting the switches and the solenoid across the storage battery of the vehicle, a tension member responsive to the flexure condition of a cushion for the seat controlling the contacts of the override switch so that the solenoid is inoperative to unlatch the seat during the presence of such pressure on said seat cushion as affects the tension member.

5. In motor vehicle seat actuating mechanism for a moveable seat, the combination comprising latch means for the seat, a solenoid actuable to release the latch means, a switch, structure closing the switch at a predetermined point in the opening of the door of the vehicle, an override switch, an electrical circuit for connecting the switches and the solenoid across a power source, a tension member actuated by the relaxed condition of a cushion for the seat for closing the override switch whereby the seat is unlatched upon a preselected amount of door opening and absence of cushion pressure.

6. In a motor vehicle seat actuating mechanism for a swivel seat, the combination comprising linkage means operative upon movement of a door of a vehicle, a flexible cable interconnecting the linkage means and the swivel mount of the seat, said cable placed in compression and tension, respectively, corresponding to opening and closing door movements whereby the swiveling action of the seat follows such door movements, latch means for the seat, a solenoid for actuating the latch means to unlatch the seat, a switch for placing said solenoid in circuit, the contacts of said switch closed at a predetermined point in the opening movement of the door, an overtravel spring operative on the cable to bring the seat into its corresponding extreme position prior to final closing of the door, an override switch, an electrical circuit for connecting the switches and the solenoid across a power source, a tension member controlling the position of the contacts of the override switch, the tension member operative on a cushion for the seat by which it is relaxed and placed in tension corresponding, respectively, to the weight supporting and relaxed conditions of said cushion, said solenoid inoperative to unlatch the seat in the weight supporting condition of said cushion.

References Cited in the file of this patent

UNITED STATES PATENTS

| 2,117,409 | Dorsey | May 17, 1938 |
| 2,606,626 | Meyer | Aug. 12, 1952 |
| 2,624,613 | Parmely | Jan. 6, 1953 |
| 2,731,100 | Butler | Jan. 17, 1956 |
| 2,809,690 | Walther et al. | Oct. 15, 1957 |
| 2,815,796 | Lobanoff | Dec. 10, 1957 |
| 2,822,858 | Mussler | Feb. 11, 1958 |
| 2,868,271 | Pickles | Jan. 13, 1959 |
| 2,992,852 | Loofbourrow et al. | July 18, 1961 |

FOREIGN PATENTS

| 306,860 | Germany | July 17, 1918 |